Oct. 22, 1963  R. H. WISE  3,107,384
WINDSHIELD WIPER BLADE
Filed Sept. 12, 1960
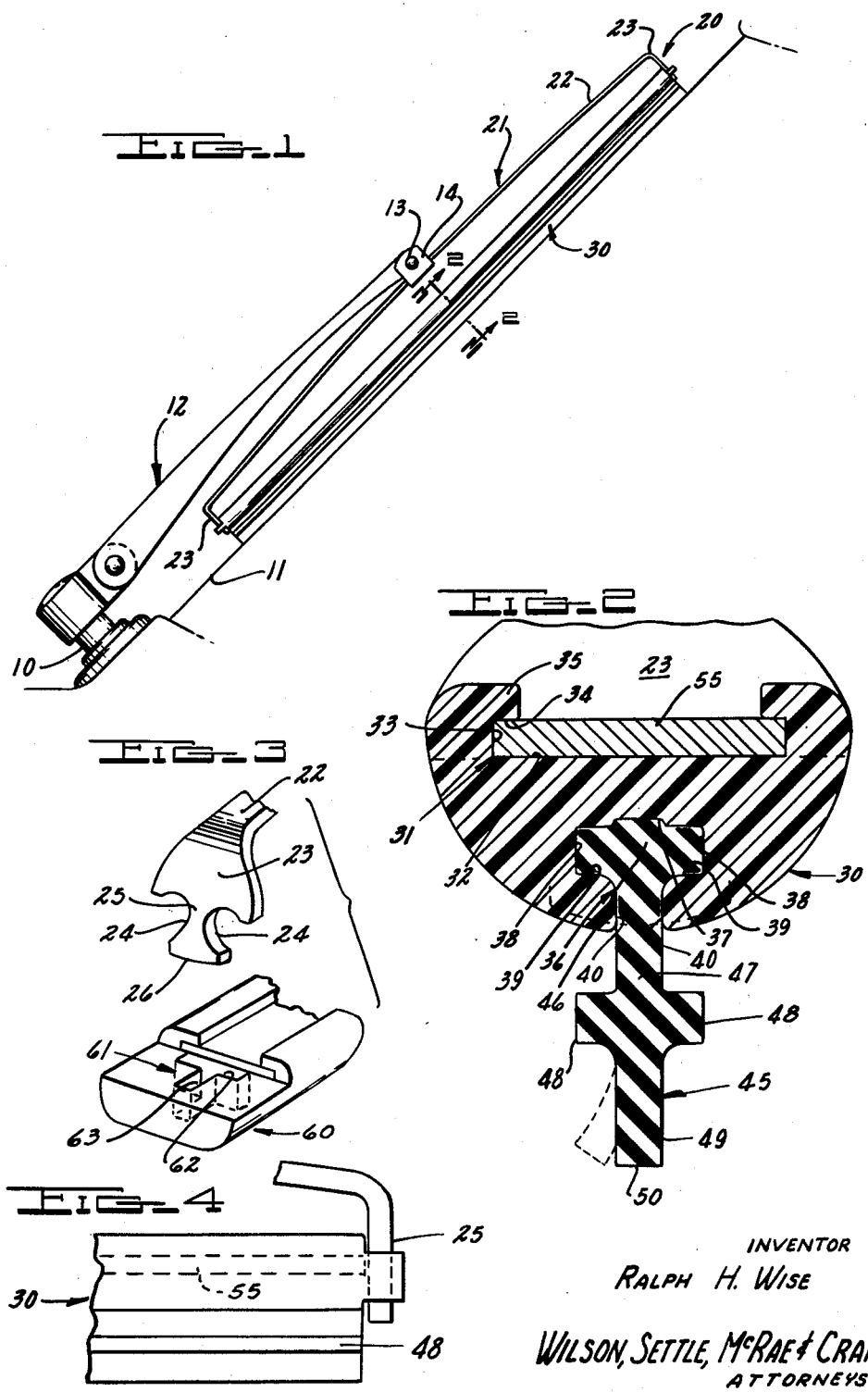
INVENTOR
RALPH H. WISE
WILSON, SETTLE, McRAE & CRAIG
ATTORNEYS United States Patent Office 3,107,384
Patented Oct. 22, 1963

3,107,384
WINDSHIELD WIPER BLADE
Ralph H. Wise, 211 N. Church Ave., Dyersburg, Tenn.
Filed Sept. 12, 1960, Ser. No. 55,378
5 Claims. (Cl. 15—250.42)

The present invention relates to a windshield wiper blade and more particularly to such a blade wherein a non-metallic carrier element is attached to a supporting superstructure to maintain a wiping element in the correct element-to-windshield posture for efficient wiping action.

As is well known in the art, many different types of windshield wiper blade constructions have been proposed, particularly since the advent of the one-piece curved windshield for automobiles. Such wipers conventionally employ a molded rubber wiping element reinforced and supported by metallic stiffeners against torsional deflection. These metallic stiffeners also provide the means to which a supporting multi-part superstructure is attached for carrying the wiping element through its oscillating movement and for urging the wiping element into contact with the windshield. Such structures are inherently expensive because of the several different wiping, stiffening and supporting elements necessary; the danger of scratching the windshield with the metallic stiffening elements is always present; and the necessity of accommodating relative movement between the superstructure and the stiffening element while still accurately supporting the wiping element against torsional deflection.

The present invention now provides a new and improved windshield wiper blade which differs radically from those of the prior art in that there is no contact between the supporting superstructure and any metallic or other stiffening elements. Thus, the problem of attaching the superstructure to the stiffening element is eliminated, as well as the necessity for accommodating relative movement between the superstructure and the stiffening element without permitting excessive "lay over" of the wiping element. Further, substantial economies in the manufacturing costs of the blade are effected, and there is no possibility of scratching the windshield with any metallic element.

Generally, the windshield wiper blade of the present invention proposes the utilization of a non-metallic carrier for a wiping element. Structurally, this carrier may comprise an extruded length of plastic material, such as nylon, delrin or the like, and which is suspended between the remote ends of a tensile bow, the carrier being placed under tension and, if necessary, being reinforced against torsional deflection by means of a stiffening element which has no connection with the bow and which is merely retained within a groove in the carrier element. The carrier element is also provided with a wiping edge, preferably forming a part of a separate wiping element secured to the carrier and projecting therebeyond for contact with the windshield to be wiped. The bow ends are secured to the carrier, preferably without extraneous fastening means, the tension of the bow being utilized to maintain the carrier and the bow against relative movement, and the bow ends overlap the stiffener and the wiping element, if used, so as to prevent displacement of these members from the carrier.

It is, therefore, an important object of the present invention to provide a new and improved windshield wiper blade of extremely low cost and possessing several operational advantages not heretofore attainable.

Another important object of this invention is the provision of a windshield wiper blade utilizing a non-metallic carrier element to which a superstructure is attached and serving to carry a wiping element for contact with a windshield surface.

It is a further object of this invention to provide a novel windshield wiper structure wherein a grooved carrier is provided with a wiping element seated in the carrier groove and projecting therebeyond for contact with a surface to be wiped, the carrier being maintained under tension by a superstructure secured only to the remote ends of the carrier.

Still another important object of this invention is the provision of a windshield wiper blade wherein a carrier formed of plastic or other non-metallic material is provided with a stiffener for resisting torsional deflection and with a resiliently distortable wiping element, the carrier being suspended within a supporting bow under tension, the bow ends being secured to the remote ends of the carrier and securing the carrier, stiffener and wiping elements in assembly.

Other objects of this invention will appear in the following description and appended claims, reference being had to the accompanying drawings forming a part of this specification wherein like reference characters designate corresponding parts in the several views.

On the drawings:

FIGURE 1 is a side elevational view of a windshield wiper blade of the present invention;

FIGURE 2 is a greatly enlarged sectional view taken along the plane 2—2 of FIGURE 1;

FIGURE 3 is an exploded view illustrating the method of assembly of the blade;

FIGURE 4 is a fragmentary side elevational view of an end only of the blade illustrating the blade after assembly.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 refers generally to an oscillatory pivot shaft of an automobile or other vehicle positioned adjacent the lower extremity of a windshield 11, the surface of which is to be wiped by a windshield wiper blade of the present invention.

Mounted on the pivot shaft 10 for co-rotation therewith is an actuating arm 12 overlying the surface of the windshield 11 and provided at its outer end with a pivotal connection 13 securing an attachment bracket 14 to the arm, the bracket 14 being mounted upon a windshield wiper blade 20 of the present invention. The arm 12, the bracket 14 and the pivotal connection 13 form no part of the present invention and any conventional mounting accommodating relative pivotal movement between and co-oscillation of the arm 12 and the blade 20 may be utilized.

The blade 20 comprises generally a supporting superstructure 21 to a medial portion 22 of which the bracket 14 is connected by suitable means (not shown).

The bow 21 also comprises angularly deflected end portions 23 which, as best shown in FIGURE 3 of the drawings, may be of substantially greater width than the medial portion 22 of the bow. These ends or terminal portions 23 are deflected inwardly toward the surface of the windshield 11 and are provided at their opposite lateral extremities with arcuate recesses 24 defining therebetween a reduced throat portion 25 serving to join the medial portion 22 to a laterally enlarged extreme end portion 26.

The bow is joined, by means to be hereinafter more fully described, to a carrier 30 which is non-metallic and which is preferably formed as an extrusion of nylon, delrin, synthetic rubber or the like. This carrier 30 is of appreciable vertical and transverse dimension and is of a cross-sectional contour illustrated in FIGURE 2 of the drawings.

The carrier 30 is provided with an upper slot 31 which is of re-entrant shape having a bottom wall 32, upstanding side walls 33 and inturned marginal walls 34 defined by upper flanges 35 formed integrally with the carrier and overhanging the longitudinal marginal edges of the slot bottom wall 32. The slot 31 is substantially coextensive with the carrier 30 and is open at each longitudinal extremity thereof.

A lower re-entrant slot 36 is also provided in the carrier, this slot comprising an upper wall 37, transversely spaced side walls 38 and bottom walls 39 blending smoothly into a reduced throat defined by vertical walls 40.

Seated within this lower re-entrant slot 36 is the upper extremity of a resiliently deflectable wiping element indicated generally at 45 and comprising an elongated member formed of rubber, either natural or synthetic, a highly plasticized plastic, such as nylon or the like. The wiping element 45 is substantially co-extensive with the carrier 30 and includes a double T section the upper, transversely enlarged section 46 of which conforms closely to the contour of the slot 36 and which is joined by an upper web portion 47 to a lower transversely enlarged portion provided with transverse ribs 48 blending into the laterally deflectable lower wiping portion 49 having a terminal wiping edge 50.

As is well known in the art, the wiping of glass with an oscillating wiping edge requires almost line contact between the wiping edge and the glass surface. Such line wiping contact is provided by the transverse deflection of the lower wiping portion 49 as illustrated in dotted outline in FIGURE 2 of the drawings.

Seated in the upper slot 31 is a stiffener 55 formed of metal, delrin, or the like and of substantially greater width than thickness. This stiffener is seated in the slot 31 in flat-wise contact and serves to aid in resisting lateral deflection and/or torsional distortion of the carrier 30. The stiffener 55 is readily deformable in a plane normal to the plane of the windshield 11 to be wiped, but is relatively non-deformable in the plane of oscillation of the arm 12 or in planes parallel to the windshield 11. The stiffener is not secured in any way within the groove 31, other than by its frictional contact with the groove walls 32, 33 and 34.

As above explained, the bow 21 is secured to the carrier 30 and not to the stiffener 55. As illustrated in FIGURES 3 and 4, the carrier 30 is provided with end portions 60 of reduced thickness, such end portions being formed by removing vertically spaced portions of the vertical dimension of the carrier at the longitudinal extremities of the carrier. This reduced thickness portion is then provided with a vertically extending slot 61 of T-shaped configuration, the slot having a transversely enlarged opening 62 placed inwardly of a reduced opening 63.

To assemble the blade, it is merely necessary to place the stiffener 55 in its groove 31 as illustrated in FIGURE 2, the stiffener terminating at its ends short of the enlarged transverse portions 62 of the slot 61.

Next, the wiping element 45 is inserted in its slot 36. Preferably, the upper portion 46 of the wiping element 45 is oversized with respect to the slot 36 and is assembled therein by stretching the resiliently deformable wiping members 45 longitudinally, thereby reducing its width, threading the stretched element 45 into the carrier 30 by inserting the portion 46 into the slot or groove 36, and then releasing the member 45 from the tensile force previously applied thereto. In this manner, the element 46 may be snugly positioned within the groove 36.

Next, the bow 21 is assembled onto the carrier bearing the stiffener 55 and the wiping element 45 by flexing the bow from its normal relaxed condition and inserting the extremities 26 of the downturned bow ends 23 into the transversely enlarged slot portions 62 until the reduced throat portion 25 intermediate the arcuate cut-outs 24 is brought into registry with the reduced outer slot portions 63. Upon release of the bow from the distorting force thereon, the bow throat portions 25 will enter the reduced slot portions 63 and the tension in the bow will maintain the bow and carrier in assembly.

It will be readily appreciated that the present invention provides a new and novel windshield wiper blade. The cost of the blade is substantially reduced because of the utilization of the single piece bow for the multi-part superstructure heretofore utilized, the utilization of a plastic or other non-metallic extrusion as the carrier 30, the utilization of a non-formed strip stock stiffener 55, and the utilization of a relatively small molded or formed wiping element 45. Further, the non-metallic carrier 30 fully protects the glass 11 from contact with any metallic parts, such as the bow 21 or the stiffener 55, although these parts may be formed of non-metallic, relatively rigid materials such as delrin or the like. Additionally, it will be noted that the carrier 30 is maintained under tension at all times because of the deformation of the bow 21 from its normally relaxed overall length to a lesser length upon installation of the bow with the carrier. However, such tensile forces are not exerted upon the stiffener 55 which is free to move longitudinally within its slot 31, but which is trapped therein intermediate the ends 23 of the bow 21. Further, the only tensile force to which the wiping element 45 will be subjected is limited by the frictional drag between the element 45 and the carrier 30. If desired, the wiping element 45 may be adhesively secured in the carrier 30.

Having thus described my invention, I claim:

1. A windshield wiper blade comprising an elongated plastic carrier having longitudinally extending re-entrant grooves in opposite faces thereof, a stiffener of greater width than thickness seated flat-wise in one of said grooves, a rubber-like wiping element seated on the other of said grooves and having a resiliently deflectable wiping edge projecting therebeyond for edge contact with a windshield surface to be wiped, and a bow having a medial portion spaced from the stiffener side of the carrier and end portions engaging the carrier at the remote ends thereof, the bow end portions overlapping the open ends of said grooves to prevent the escape of said stiffener and said wiping element therefrom.

2. A windshield wiper blade comprising an elongated plastic carrier having longitudinally extending re-entrant grooves in opposite faces thereof, a stiffener of greater width than thickness seated flat-wise in one of said grooves, an elastomeric wiping element seated on the other of said grooves and having a resiliently deflectable wiping edge projecting therebeyond for edge contact with a windshield surface to be wiped, and a superstructure engaging the carrier at spaced points therealong and overlapping the ends of said carrier to prevent the escape of said stiffener and said wiping element from said carrier.

3. A windshield wiper blade comprising an elongated plastic carrier having a longitudinally extending re-entrant groove in one longitudinal face thereof, a stiffener of greater width than thickness seated flat-wise in said groove, means carried by said carrier providing a resiliently deflectable wiping edge projecting therebeyond for edge contact with a windshield surface to be wiped, and a bow having a medial portion spaced from the stiffener side of the carrier and end portions engaging the carrier adjacent the remote ends thereof, the bow end portions overlapping the open ends of said groove to prevent the escape of said stiffener therefrom.

4. In a windshield wiper blade having a support structure, a non-metallic carrier secured to said support structure and having a re-entrant open-ended groove coextensive therewith and opening onto one lateral face thereof, and a wiping element having a transverse flange portion seated in said groove and a wiping edge projecting beyond said carrier, said wiping edge being joined to said flange by a reduced width hinge portion exterior to said carrier and accommodating resilient lateral deflection of said edge relative to said carrier, and said support structure overlapping the groove ends to trap said wiping element therein.

5. A windshield wiper blade comprising an elongated plastic carrier having a longitudinally extending re-entrant groove in one longitudinal face thereof, said groove opening onto the end faces of the carrier, an elastomeric wiping element seated in said groove and having a resiliently deflectable longitudinal wiping edge projecting from the carrier for edge contact with a windshield surface to be wiped, and a bow having a medial portion spaced from the carrier and end portions engaging the carrier adjacent the remote ends thereof, the bow end portions overlapping the open ends of said groove to prevent the escape of said wiping element therefrom.

References Cited in the file of this patent

UNITED STATES PATENTS

| | | |
|---|---|---|
| 2,039,716 | Horton | May 5, 1936 |
| 2,659,097 | Morton | Nov. 17, 1953 |
| 2,700,785 | Oishei et al. | Feb. 1, 1955 |
| 2,712,146 | Wise | July 5, 1955 |

FOREIGN PATENTS

| | | |
|---|---|---|
| 533,392 | Italy | Sept. 21, 1955 |
| 1,124,116 | France | June 25, 1956 |
| 1,223,079 | France | Jan. 25, 1960 |